(12) United States Patent
Cousins et al.

(10) Patent No.: US 10,132,709 B2
(45) Date of Patent: Nov. 20, 2018

(54) SYSTEM AND METHOD FOR DETECTING VEHICLE ANOMALIES DURING GROUND TRAVEL

(71) Applicant: The Boeing Company, Chicago, IL (US)

(72) Inventors: Clifford G. Cousins, Cypress, CA (US); Sean M. Casey, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 478 days.

(21) Appl. No.: 14/826,717

(22) Filed: Aug. 14, 2015

(65) Prior Publication Data

US 2017/0045409 A1    Feb. 16, 2017

(51) Int. Cl.
*G01M 1/12*    (2006.01)

(52) U.S. Cl.
CPC .................................. *G01M 1/125* (2013.01)

(58) Field of Classification Search
CPC ...................................................... G01M 1/127
USPC ...................................................... 73/65.01
See application file for complete search history.

(56) References Cited

U.S. PATENT DOCUMENTS

| | | | |
|---|---|---|---|
| 5,214,586 A | 5/1993 | Nance | |
| 6,128,951 A | 10/2000 | Nance | |
| 7,945,422 B2 | 5/2011 | Vetsch | |
| 7,967,244 B2 | 6/2011 | Long | |
| 8,000,835 B2 | 8/2011 | Friz | |
| 8,209,069 B1 * | 6/2012 | McLoughlin | G01C 21/165 244/158.1 |
| 8,340,892 B2 | 12/2012 | Long | |
| 8,583,354 B2 | 11/2013 | Klier | |
| 2010/0185354 A1 | 7/2010 | Pruett | |
| 2013/0197792 A1 | 8/2013 | Wolfram | |
| 2014/0012468 A1 | 1/2014 | Le et al. | |

(Continued)

FOREIGN PATENT DOCUMENTS

EP    2772743 A1    9/2014

OTHER PUBLICATIONS

Sadraey M., Aircraft Design: A Systems Engineering Approach, Chapter 9, Nov. 2012, Wiley Publications.

*Primary Examiner* — Walter L Lindsay, Jr.
*Assistant Examiner* — Philip Marcus T Fadul
(74) *Attorney, Agent, or Firm* — MH2 Technology Law Group LLP

(57) ABSTRACT

A system for detecting vehicle load anomalies during ground travel includes at least one inertial sensor sensing a pitch or a roll of a vehicle and outputting at least one of a pitch or a roll value; a computing device having a processor and a memory and an input coupled to an input and monitoring module, where said input and monitoring module receives one of the pitch or roll values output by the at least one inertial sensor, and said computing system further having a measuring module measuring an oscillation based on one of the output pitch or roll values and calculating an adjusted center of gravity value based on a comparison between an expected oscillation and the measured oscillation; said computing device having an output to an alert module that outputs an alert signal through said output if the adjusted center of gravity is outside of a predetermined threshold.

21 Claims, 10 Drawing Sheets

(56) References Cited

U.S. PATENT DOCUMENTS

| | | | |
|---|---|---|---|
| 2014/0097297 A1* | 4/2014 | Yanagawa | B64D 9/00 244/137.1 |
| 2014/0260569 A1* | 9/2014 | Watanabe | G01M 1/22 73/65.07 |
| 2015/0251563 A1* | 9/2015 | Shirokura | B60L 15/20 701/22 |

* cited by examiner

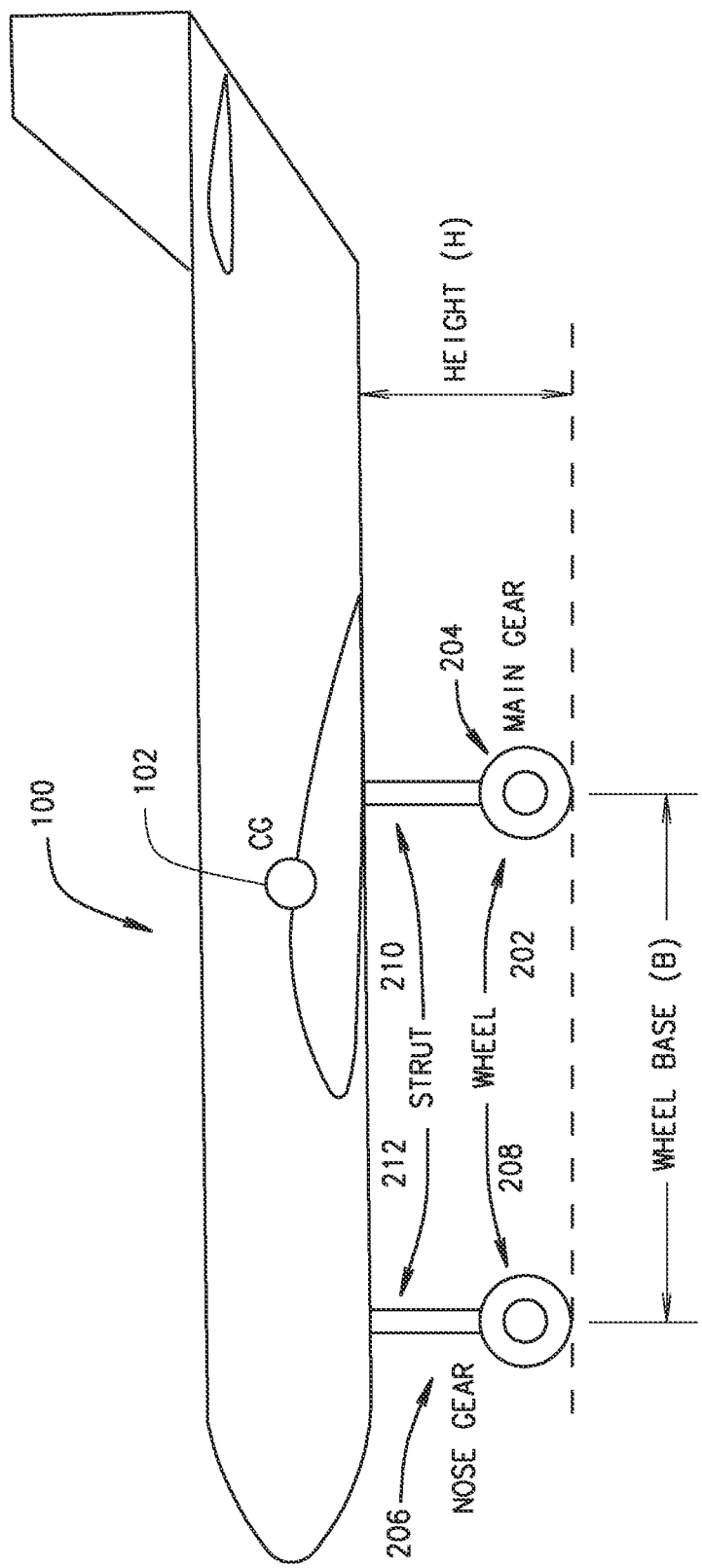
F I G. 2

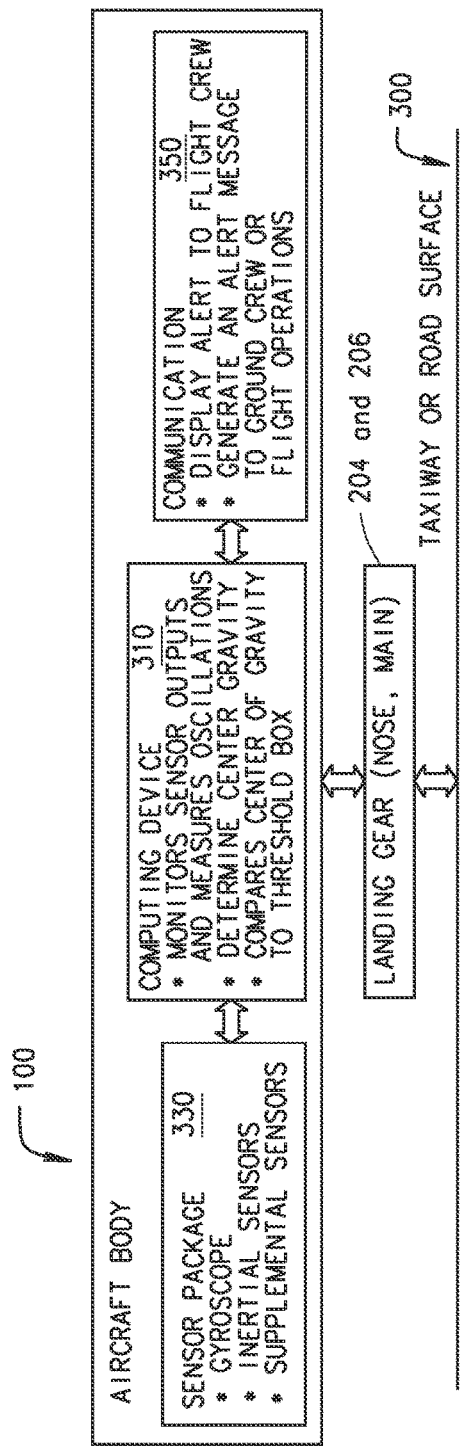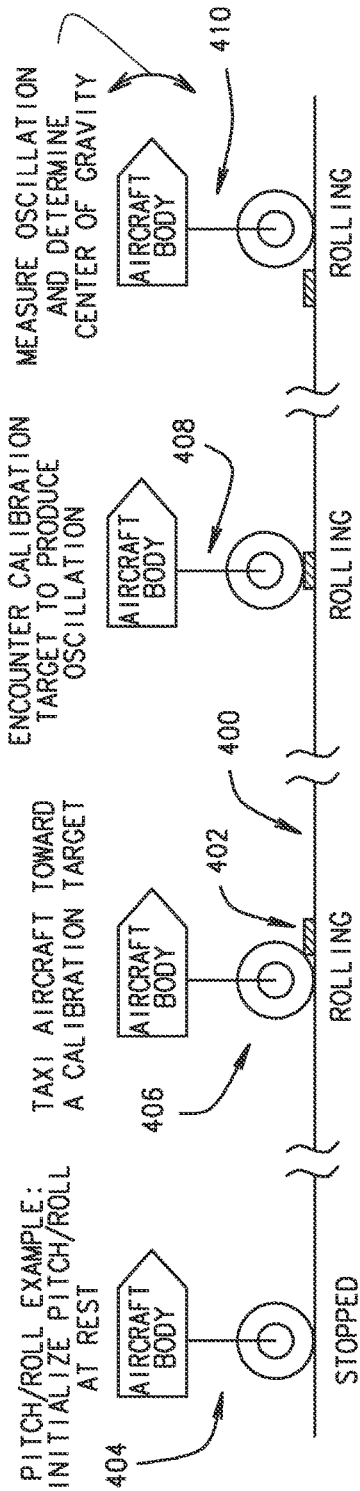
FIG. 3
FIG. 4

SYSTEM AND METHOD FOR DETECTING VEHICLE ANOMALIES DURING GROUND TRAVEL

FIELD

This technology as disclosed herein relates generally to measuring the center of gravity of a vehicle during ground travel, more particularly, to detection of a mis-load and/or shift-load condition for an aircraft.

BACKGROUND

The center of gravity of an unladen aircraft may shift once the aircraft is loaded with cargo and/or passengers. For a cargo or military aircraft, the center of gravity (forward/aft, port/starboard) may be calculated by a load master who may use a calculator device and/or computer program based on various assumptions. A load master may weigh pallets, vehicles, or other transportable items, then calculate a center of gravity based on the weights and planned location of these transportable items. A load plan is typically tolerant of some variation, but an unexpected or extreme variation could lead to a hazardous condition for the aircraft. For example, the load pallets may be queued up in order and loaded quickly. However, it is possible the cargo pallets may be loaded in the wrong order, or may be loaded into a wrong location or secured improperly. For a commercial airliner, an assumption for load can be made based on the average weight of a passenger and the expected seat assignments and the location and average weight of a luggage/cargo carrier.

Also, aircraft typically have several fuel tanks, and these tanks have gauges to indicate the amount (number of pounds) of fuel in each tank, thereby providing load information. However, it is possible the gauges could be faulty, or some other confusion in fueling the aircraft (e.g. there is confusion as to which tank fuel was added or fuel is added to an incorrect tank causing an unbalanced condition), which could lead to an imbalance that might not be noticed by the flight crew. Some aircraft include weight sensors in the landing gear and can directly measure the weight-on-wheels. Other aircraft have no such weight sensors, and therefore rely entirely on the skill of the ground crew and load master to ensure proper balance. For a land vehicle, such as a car or a light truck, various sensors of critical systems like tire pressure gauges within the tires report the pressure and some vehicles have automatic load leveling to ensure a smooth ride. However, these systems tend to measure only static quantities and may adjust only periodically. Such measurements may not be sufficient for vehicle ground travel such as aircraft taxi conditions. A drawback with such systems is that the actual weight is never measured.

For an aircraft taxing to takeoff, the last chance to abort a takeoff in a mis-loaded or shift-loaded aircraft condition is right after the initiation of rotation during the takeoff run. As the aircraft is rotating and before liftoff, the aircraft has a new posture and dynamic behavior. If a cargo palette or luggage module is not anchored properly and shifts backwards during rotation, the aircraft can suddenly experience a shift in the center of gravity and the nose can unexpectedly positively pitch up at a greater rate than intended. A pilot may not feel this in their hands on the yoke or steering device due to feedback insensitivities or distractions such as increased noise levels, looking for possible ground cross-traffic or potential bird strikes. The shifting of an improperly tethered load or breaking of a tether could happen almost immediately after rotation begins, so there can enough time to abort the takeoff prior to achieving liftoff speed or running out of runway if the mis-load or shift-load aircraft condition is immediately detected.

In this manner, the pitch behavior and forward-aft displacement of the center of gravity due to mis-loading or shift-load can be more important than the side-to-side mis-loading or shift-load. The lever-arm or moment effect of a mis-load or of a shift-load forward-aft can provide a larger effect because the possible displacement distances can be longer due to the elongated nature of many aircraft where the cargo/luggage loadable sections of the fuselage are much longer than they are wide. There are many potential causes of load imbalance, including:

mis-loading of cargo (not loading pallets according to plan, wrong order), improperly securing of loads where a tether or anchor could break or a floor anchor becomes unlocked resulting in a shift-load condition, mis-loading of fuel in various wing or other tanks, leakage of fuel from a tank and/or degradation of an undercarriage element (e.g. a gear or strut).

Many carrier aircraft have an undercarriage with main gear under each wing or attached to the fuselage under the wing attachments and a nose gear assembly arranged at three-points of a triangle. This landing gear configuration, often referred to as, "tricycle gear", provides good protection against tipping forward during landing since the nose wheel is raised higher than the main gear during the landing flare, and is also far forward of the center of gravity at the nose gear touch down. The main landing gear of the tricycle arrangement enables side-to-side stability against wind gusts or irregular landing where a bounce on one main gear may impart a roll motion to the aircraft. Tricycle gear also provides more optimal take off maneuvering by allowing rotation prior to liftoff from the runway, which increases the angle of attack and thus the lift of the wings.

A system and method is needed that can detect during taxi or at rotation the occurrence of such a mis-load or shift-load condition as described.

SUMMARY

The technology as disclosed herein includes a system and method for measuring a center of gravity for a vehicle, and for an aircraft vehicle, detecting during taxi or at rotation the occurrence of a mis-load or shift-load condition prior to take off. This invention provides an indirect method of measuring the center of gravity and effective balance point of the total vehicle load.

As described, for an aircraft taxing to takeoff, the last chance to abort a takeoff in a mis-loaded or shift-loaded aircraft condition is right after the initiation of rotation during the takeoff run. As the aircraft is rotating and before liftoff, the aircraft has a new posture and dynamic behavior. If a cargo palette or luggage module is not anchored properly and shifts backwards during rotation, the aircraft can suddenly experience a shift in the center of gravity and the nose can rise unexpectedly and positively pitch-up at a greater rate than intended. A pilot may not feel this in their hands on the yoke as they pull back due to their focusing on other factors, due to increased noise levels, looking for possible ground cross-traffic, or potential bird strikes, but the sensors would detect this new rotational impulse and could signal an abort to the pilot while the aircraft is still able to counter-rotate and stop.

The technology as disclosed also addresses a need to objectively determine the center of gravity for a ground vehicle in order to detect a hazardous mis-load or shift-load aircraft condition, such as during aircraft ground taxi operations, without directly weighing the vehicle or its contents. The technology as disclosed can also be used to detect degenerative conditions in a ground vehicle before those conditions become hazardous. Various sensors are already available on nearly every commercial and military aircraft, but are not typically used for this new purpose during taxi operations. Hence, the cost of implementing the technology as disclosed is very low. Initially, a gyroscope or inertial sensors are stable at rest when the aircraft is at the gate or is stopped short on the taxiway. Then, the gyroscope pitch and roll or inertial sensor output values can be monitored during taxi or ground movement operations and oscillations can be measured. From that measured oscillatory behavior, a balance point and center of gravity can be determined and compared with what is expected for a that particular vehicle. A difference from the measured and expected can be compared with a threshold, and the crew or others can be notified if the threshold is exceeded. Further, for an aircraft vehicle, the oscillatory behavior could be compared with "normal" behavior for that aircraft both throughout the life of the aircraft and specifically at a particular aircraft location.

There are dampening elements in the undercarriage of an aircraft. Typically, there are shock-absorbing and flexible struts which tend to dampen any abrupt or severe shocks. Also, the wheels are typically air-filled tires that have a well-known damping quality to absorb energy from bumps while taxi and landing. These dampening effects of the struts and wheels are not symmetrical, meaning they do not dampen as much of a pitch-up motion as they do a pitch down motion. While it is true the undercarriage tends to dampen shocks/impulses, it is actually the period of the measured, oscillatory response of the airframe that is most important, not necessarily the amplitude. As previously described, many carrier aircraft have an undercarriage with main gear configured as a "tricycle gear", which does not provide protection against tail-strike if a positive impulse pitch up at a greater rate than intended occurs. Therefore, even though the impulse magnitude is less due to the dampening effect of the undercarriage, the oscillatory motion imparted to the airframe will be measurable.

For example, a particular aircraft may traverse the same ground way point when leaving any of several gates at a concourse at a particular airport. A global positioning system (GPS) sensor can be included in the system and method disclosed to correlate current verses prior vehicle responses to the same ground waypoint or obstacle, while tracking both the location and angle of attack of the vehicle relative to the target object. While each aircraft and each traverse of the same ground may be slightly different, it is expected there will be some correlation in oscillatory behavior which could be used to track various vehicle anomalies and possible degeneration over time. This correlated data can be used to determine what is "normal" for this vehicle and when service or inspection is needed. The center of the oscillation can be compared to that of an unladen aircraft, or the same previously laden aircraft, and can be used to determine a measured center of gravity. The historical measurements are important since they provide a baseline for this particular aircraft or vehicle and possible degradation of performance of an undercarriage component as well as a comparison with the previous measurements.

One implementation of the technology as disclosed includes a system for detecting vehicle load anomalies during ground travel including at least one inertial sensor sensing at least one of a pitch or roll of a vehicle during ground travel and outputting at least one of a pitch or a roll value corresponding to the sensed pitch or roll. According to the implementation, the technology as disclosed can also include a computing device having a processor and a memory and an input coupled to an input and monitoring module being processed by said processor, where said input and monitoring module being processed by the processor receives one of the pitch or roll values output by the at least one inertial sensor, and said computing system further having a measuring module measuring an oscillation based on one of the output pitch or roll values and calculating an adjusted center of gravity value based on a comparison between an expected oscillation and the measured oscillation. The computing device can have an output coupled to an alert module being processed by the processor, where the alert module receives the adjusted center of gravity value and outputs an alert signal through said output if the adjusted center of gravity is outside of a predetermined threshold. The inertial sensor can be a component of a built-in inertial navigation unit or a removably installed portable computing device.

A supplemental inertial sensor sensing a supplemental pitch value of the vehicle can also be utilized during ground travel where the supplemental inertial sensor is located along a lateral horizontal line passing proximately through an unladen center of gravity and the sensor can be configured to output a supplemental pitch value. In one implementation, yet another supplemental inertial sensor (a second supplemental sensor) sensing a supplemental roll of the vehicle during ground travel can be utilized where the second supplemental inertial sensor is located along a vertical line passing proximately through the unladen center of gravity and the second supplemental sensor can output a supplemental roll value. The input and monitoring module can also receive the supplemental pitch and supplemental roll values and calculate an adjusted center of gravity value based on a comparison between the expected oscillation and the measured oscillation sensed by the inertial sensor and the first and second supplemental inertial sensors. In one implementation of the technology, the sensors and their output can be utilized as a the vehicle travel over a calibrated surface irregularity.

The vehicle can be one of an aircraft, an automobile or a truck. A historical data collection module at said computer system can be utilized on the vehicle for collecting and storing over time the measured oscillation at a memory and determining the expected oscillation based on the measured oscillation stored over time. Using calibrated surface irregularities can also be utilized when accumulating historical data. For any type of vehicle, a global positioning system can be utilized for correlating inertial sensor data of a current vehicle being currently measured with inertial sensor data of prior vehicle responses to a same ground waypoint and for the same type vehicle, and determining a difference between the inertial sensor data of the current vehicle being currently measured and the inertial sensor data of prior vehicle responses. If the difference is outside of the same ground waypoint threshold, a maintenance alert signal can be transmitted.

The system and method can include locating supplemental pitch and roll sensors near the actual, unladen center of gravity, which can provide for a more precise measurement of differences due to mis-loading or shift-loading both during taxi operations and also as the aircraft rotates to take off. A supplemental pitch sensor can be located based on a (left/right) lateral horizontal line at about an aircraft's unladen center of gravity. For example the sensors can be positioned on one or both side walls of the fuselage along a lateral line that passes left/right through the actual unladen center of gravity of the aircraft. This lateral horizontal line would intersect the sides of the aircraft body on the left and right sides of the aircraft. A first supplemental pitch sensor can measure about a first pitch axis and a second supplemental pitch sensor can measure about a translated first pitch axis.

Similarly, a supplemental yaw sensor can be located based on a (top/bottom) vertical line about the unladen center of gravity. In this case, the vertical line passes top/bottom through the actual center of gravity of the aircraft. This vertical line would intersect the top and bottom of the aircraft body above and below the actual unladen, center of gravity. A first supplemental roll sensor can measure about a first roll axis and a second supplemental roll sensor can measure about a translated first roll axis. A side lateral or vertical supplemental sensor can be located to detect yaw.

According to an implementation of the technology as disclosed, a method for detecting vehicle load anomalies during ground travel includes sensing at least one of a pitch or roll of a vehicle with at least one inertial sensor during ground travel and outputting at least one of pitch or roll values. The method can further include monitoring at a computing system having an input coupled to a monitoring module, with said input and monitoring module and receiving the at least one of the pitch or roll values output by the at least one inertial sensor, and further measuring at said computing system with a measuring module an oscillation based on the at least one of the output pitch or roll values output by the at least one inertial sensor, and further measuring at the computing system with a measuring module an oscillation based on the at least one of the output pitch or roll values and calculating an adjusted center of gravity value based on a comparison between an expected oscillation and the measured oscillation. This implementation can also include receiving at said computing system at an output coupled to an alert module, with said alert module, the adjusted center of gravity value and outputting an alert signal through said output if the adjusted center of gravity is outside of a predetermined threshold.

According to another implementation of the technology as disclosed, a further method for detecting vehicle load anomalies during ground travel includes, sensing at least one of a pitch or roll of a vehicle with at least one inertial sensor during ground travel and outputting at least one of pitch or roll values. The method can further include monitoring at a computing system having an input coupled to a monitoring module, with said input and monitoring module and receiving the at least one of the pitch or roll values output by the at least one inertial sensor, and further measuring at said computing system with a measuring module an oscillation based on the at least one of the output pitch or roll values and calculating an adjusted center of gravity value based on a comparison between an expected oscillation and the measured oscillation. The method further includes receiving at said computing system at an output coupled to an alert module, with said alert module, the adjusted center of gravity value and outputting an alert signal through said output if the adjusted center of gravity is outside of a predetermined threshold.

According to yet another implementation of the technology as disclosed, a system for detecting vehicle load balance anomalies during ground travel includes a monitoring and measuring module having a processor and a memory having stored thereon data representative of an aircraft nominal weight and balance parameters that include aircraft weight, strut weight and performance, nominal centers of gravity for various load conditions, and related dimensions for a vehicle having at least three struts. The implementation of the technology as disclosed can also include at least one inertial sensor configured to detect one or more of a pitch, a yaw, or a roll of a vehicle during ground travel and generate respective pitch, yaw, and roll signals. The monitoring and measuring module in communication with the at least one inertial sensor and receiving a generated respective pitch, yaw, and roll signal, and configured to measure the signals to identify oscillations corresponding to the detected pitch, yaw, and roll of the vehicle, to calculate with the nominal weight and balance parameters a new center of gravity "CG", and to generate an alert when the calculated new CG exceeds a predetermined CG envelope.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIG. 2 is an illustration of a side view of an aircraft illustrating landing gear;

FIG. 3 is an illustration of a system for detecting aircraft ground travel anomalies, according to an embodiment;

FIG. 4 is an illustration of inducing and measuring oscillation by encountering a calibration target, according to an embodiment;

Figure 1:
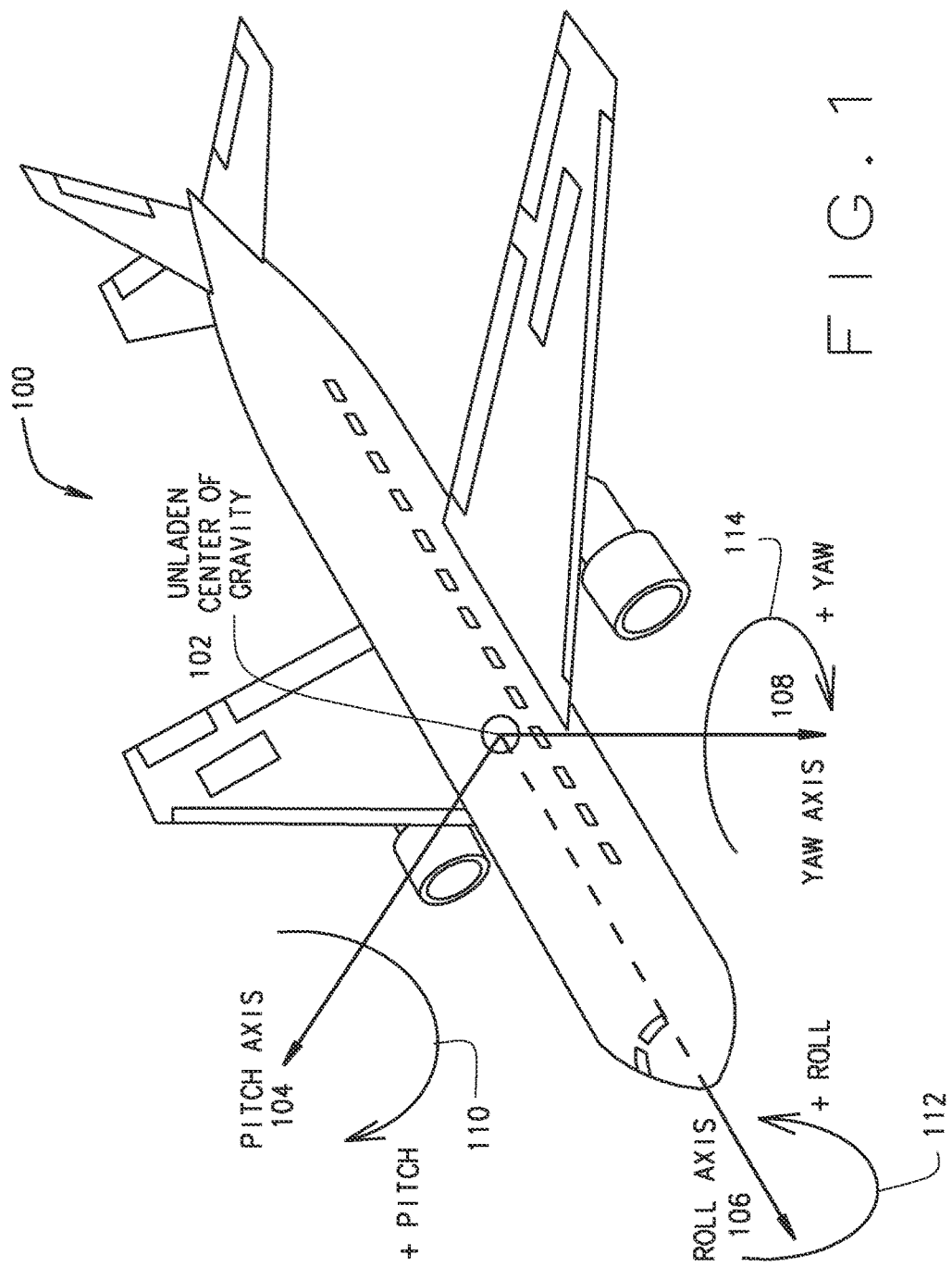
FIG. 1 is an illustration of a typical aircraft illustrating the general center of gravity and the pitch, roll and yaw rotations.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-8 and like reference numerals are being used consistently throughout to refer to like and corresponding parts of the technology for all of the various views and figures of the drawing. Also, please note that the first digit(s) of the reference number for a given item or part of the technology should correspond to the FIG. number in which the item or part is first identified.

An aircraft load, such as fuel, cargo and passengers, could be improperly loaded, the load could be miscalculated or accidentally mis-loaded (i.e. not loaded according to plan), or the load could shift during ground travel prior to flight resulting in a shift-loaded condition, which may lead to a hazardous flight condition if the aircraft were to attempt a take-off with an unbalanced or improper load. A loaded aircraft or other vehicle can be generally referred to as a laden aircraft or a laden vehicle. Whereas an empty aircraft or other vehicle can be referred to as an unladen aircraft or an unladen vehicle. Usually pre-flight inspection of the aircraft is done during the loading of cargo and passengers, and even if a flight crew member walks around the aircraft to do a pre-flight inspection after loading is completed, a significant imbalance may be difficult to observe.

One implementation of the present technology as disclosed comprises sensors for detecting vehicle anomalies teaches a novel system and method for vehicle anomalies such as an improper or unbalanced load for an aircraft prior to flight or other anomalous or degenerate situation that could lead to a hazardous condition. Various anomalous conditions or situations may be detected over time for a vehicle such as an aircraft, a car or a truck. The anomalous conditions may include a low tire pressure, leaking structural support such as a vehicle shock absorber, fatigued structural element, etc. Detection of the anomalous condition may be made using historical behavior data gathered for the vehicle in comparison with the current behavior of the vehicle.

For example, a cargo pallet may not be properly anchored, or may come loose from the anchor points, and could move on the cargo deck prior to flight. Such an incident could change the center of gravity or balance point of the aircraft in an undesirable way. In the case of a fuel tank level, such an indication may be properly displayed to a flight crew but could be overlooked due to distraction. In another example, a land vehicle such as a car or truck could experience a slowly degenerating condition that may eventually become hazardous. This may include a leaking tire, a degrading suspension system (e.g. a hydraulic leak, metal fatigue) or some other defect that may affect the driving of the land vehicle. Such emerging degenerate conditions are inherently difficult to detect.

During ground travel (taxi operations), the aircraft can traverse various bumps, gaps, grooves, and other examples of uneven surfaces in the taxiway while moving from the gate to the runway. In one example, an aircraft nose wheel may suddenly encounter a surface irregularity (bump or cavity), which moves the nose wheel and acts like an impulse that causes the nose of the aircraft to pitch up or pitch down suddenly, stimulating an oscillation of the aircraft body around the pitch axis. In another example, the surface of the taxiway may be uneven where a moving aircraft will tend to experience an undulating or pendulum motion by traversing the uneven surface. In both examples, the dynamic pitch and/or roll oscillation of the aircraft body will have a center point about which the aircraft body moves. This dynamic behavior of the aircraft body may be used to identify the center of gravity based on the pitching and rolling motion of the aircraft body after encountering a surface irregularity or uneven surface.

The arrangements described herein include at least one inertial sensor, which may also further include one or more portable accelerometers that are stand-alone and/or incorporated into a portable electronic device such as a portable electronic device. For example, many types of micro electromechanical (MEM) triaxial magnetometers (compasses) and accelerometers are available as stand-alone portable devices, and as an incorporated component of other portable electronic devices such as hand held and portable navigation devices, GPS receivers, wrist watches, cellular phones, wireless tablets, and similar devices.

For purposes of the systems and methods described here, such portable electronic devices can be modified and configured to employ the MEMs magnetometers and accelerometers to detect the pitch, roll, and yaw of the vehicle and to detect the corresponding oscillations. Further, such devices can then also communicate the detected oscillations and/or can be configured to determine the center of gravity (CG), and to generate alerts for anomalous calculated CGs. During use, these types of portable devices will need to be positioned in a location that is fixed relative to the nominal CG, so that they can be calibrated to a precise, known location in the vehicle, which enables calculation of the.

For example, for a vehicle such as an aircraft, such portable devices should be attached to a location on the flight deck having known coordinates relative to the nominal aircraft CG. Once positioned in such a known location, the aircraft can be configured with a nominal weight and balance that results in the nominal CG. With the portable devices operating, the aircraft can be moved about a ground surface to enable the portable devices to generate and record the baseline oscillations over a range of movements and ground speeds. Preferably, the aircraft will be taxied along a substantially straight and level taxiway, while being accelerated and slowed, and/or taxied over small ground surface bumps, which causes the aircraft to oscillate as the landing gear absorbs and dampens the oscillations.

Examples of how to compute the weight, balance, and center of gravity for an aircraft are known in the field of technology. See., e.g., U.S. Pat. No. 8,340,892 titled "Onboard aircraft weight and balance system", U.S. Pat. No. 7,967,244 titled "Onboard aircraft weight and balance system", U.S. Pat. No. 7,945,422 titled "Tire pressure augmented aircraft weight and balance system and method", U.S. Pat. No. 6,128,95 titled "Aircraft weight and center of gravity indicator", U.S. Pat. No. 6,128,951 titled "Aircraft weight and center of gravity indicator", U.S. Pat. No. 5,214,586 titled "Aircraft weight and center of gravity indicator", Despite several variation of such well-known techniques, most methods acquire the weight of the aircraft by sensing the weight at each landing gear oleo strut, and compute the CG by summing the known moments and dividing by the total computed weight. Various additional methods are applied to further arrive at the precise weight and balance of the aircraft.

The new capability described here includes also computing the weight, balance, and CG by treating the aircraft about each of its landing gear oleo struts as a damped spring oscillator, such as those described as driven harmonic oscillators having step inputs (aircraft taxiing over bumps), at https://en.wikipedia.org/wiki/Harmonic_oscillator. These oleo strut embodied damped spring oscillators experience forcing functions due to the aircraft taxiing over calibrated bumps as well as nominal bumps found on any taxiway.

When combined with the tri-axial magnetometer and accelerometer sensors of the contemplated devices described here, the damped oscillations detected by these sensors about the pitch, roll, and yaw axes of the aircraft during ground taxiing can be used to also compute the aircraft center of gravity, and to determine whether the detected oscillations are overdamped, critically damped, and underdamped. The determined damping state can also be used to further characterize aircraft response and to compute the CG.

The dynamic behavior of the aircraft body can also be compared with the expected movement of an empty or unladen aircraft. Also, the accumulated stimulus of repeatedly traversing a series of irregularities may accumulate and be manifested as a larger pitch deflection up and down for the aircraft body. It is also possible that an accumulated stimulus may tend to dampen oscillation, therefore, a filter can be used when sampling/measuring the movement. Similarly, either side landing gear (under wing gear) may encounter a surface irregularity that introduces an impulse that results in a roll-right and roll-left oscillation. This roll oscillation would also have a center point about which the body moves around the roll axis. Together or separately, the pitch and roll oscillations can be used to measure the location of the center of gravity for a vehicle, and if the measurement is out of tolerance, the results of this measurement can be used to notify the flight crew or others that there is a potential problem prior to flight.

In the absence of or in addition to naturally occurring irregularities, a pilot could steer to drive over a calibrated surface irregularity, e.g. "calibration bump", such as a predefined bump, gap, groove, or target obstacle with either the nose gear wheel or one of the wing gear wheels to deliberately induce the needed oscillatory behavior. This target obstacle could be a rail, a pipe, a flat piece having a certain cross-sectional width with an acceptable step response profile. Because a larger aircraft may require a larger impulse and smaller aircraft may require a smaller impulse to induce a sufficient oscillatory behavior for measurement, the height of the target calibration bump may be higher at a farther lateral distance away from the centerline of travel during taxi so that the calibration bump may have a different, or stair-stepped height along the length of the calibration bump from the center to the ends in order to accommodate and properly stimulate different aircraft.

Alternatively, a pilot could tap the brakes or actuate one or more controls momentarily to induce oscillation and let the system observe the oscillatory response. Momentarily actuating one or more flight controls, such as the nose wheel via the rudder pedals may be especially helpful to stimulate oscillatory behavior that may identify an unevenly filled wing fuel tank. Aircraft yaw motion could also be used alone or in combination with the pitch motion to measure and detect an anomaly based on a structural defect or imbalance of fuel. In this manner, vehicle motion about three axes (pitch, roll, yaw) could be observed, and the center of gravity experimentally determined, leading to a confirmation of the calculated center of gravity or else an indication of a fault condition where the vehicle could be out of acceptable tolerance for flight or road operations. Each aircraft has a known gear placement and historical behavior over time, so proper motion could be distinguished from improper.

The details of the technology as disclosed and various implementations can be better understood by referring to the figures of the drawing. Referring to FIG. 1, an illustration of a perspective view of an aircraft vehicle 100 is provided having an unladen center of gravity 102 located as illustrated. Extending from the unladen center of gravity 102, the pitch axis 104 extending laterally, the roll axis 106 extending forward-to-aft through the nose of the aircraft and the yaw axis 108 extending vertically are illustrated. The positive rotations about each of the axis 104, 106 and 108 are illustrated by the positive rotational pitch arrows 110, 112 and 114.

Referring to FIG. 2, an illustration of a left view of the aircraft 100 is provided also illustrating the unladen center of gravity (CG) 102. The side view illustrates the aircraft 100 with the main gear 204 and the associated wheel 202 and strut 210, and further with the nose gear 206 and the associated wheel 208 and strut 212.

Referring to FIGS. 3, and 4, a block diagram of on implementation of the technology is provide illustrating an aircraft 100 traveling over a surface 300. The sensor or sensor package 330 is illustrated communicating with a computing device 310 to provide a system for detecting vehicle load anomalies during ground travel. A communications module 350 is operatively connected with the computing device 310 and is configured to provide onboard and offboard alerts based on detected conditions. The sensor 330 can include a gyroscope, inertial sensors and supplemental sensors. The computing device 310 is configured to monitor sensor outputs and measure oscillations. For an aircraft vehicle, this illustration also provides the landing gear 204 and 206 as an interface between the vehicle and the ground surface.

Regarding FIG. 4, an illustration of an aircraft or vehicle body interacting with or traveling over a calibrated irregularity 402 disposed on a surface 400. The calibrated irregularity can be a calibration "bump" of a predetermined size to provide a sufficient impulse when struck by a wheel of a traveling vehicle. The pitch/roll can be initialized when the aircraft is at rest 404. The aircraft or vehicle can then move forward and travel over the taxiway or road surface 400 to engage 406 the calibrated irregularity 402. As the calibrated irregularity is engaged 406, a vertical impulse is produced 408 based on the interaction between vehicle or body 100 and predetermined calibrated surface irregularity 402. The vertical impulse stimulates an oscillation of the aircraft body that can be measured, and from that oscillatory motion the center of gravity can be determined 410.

Figure 5A:
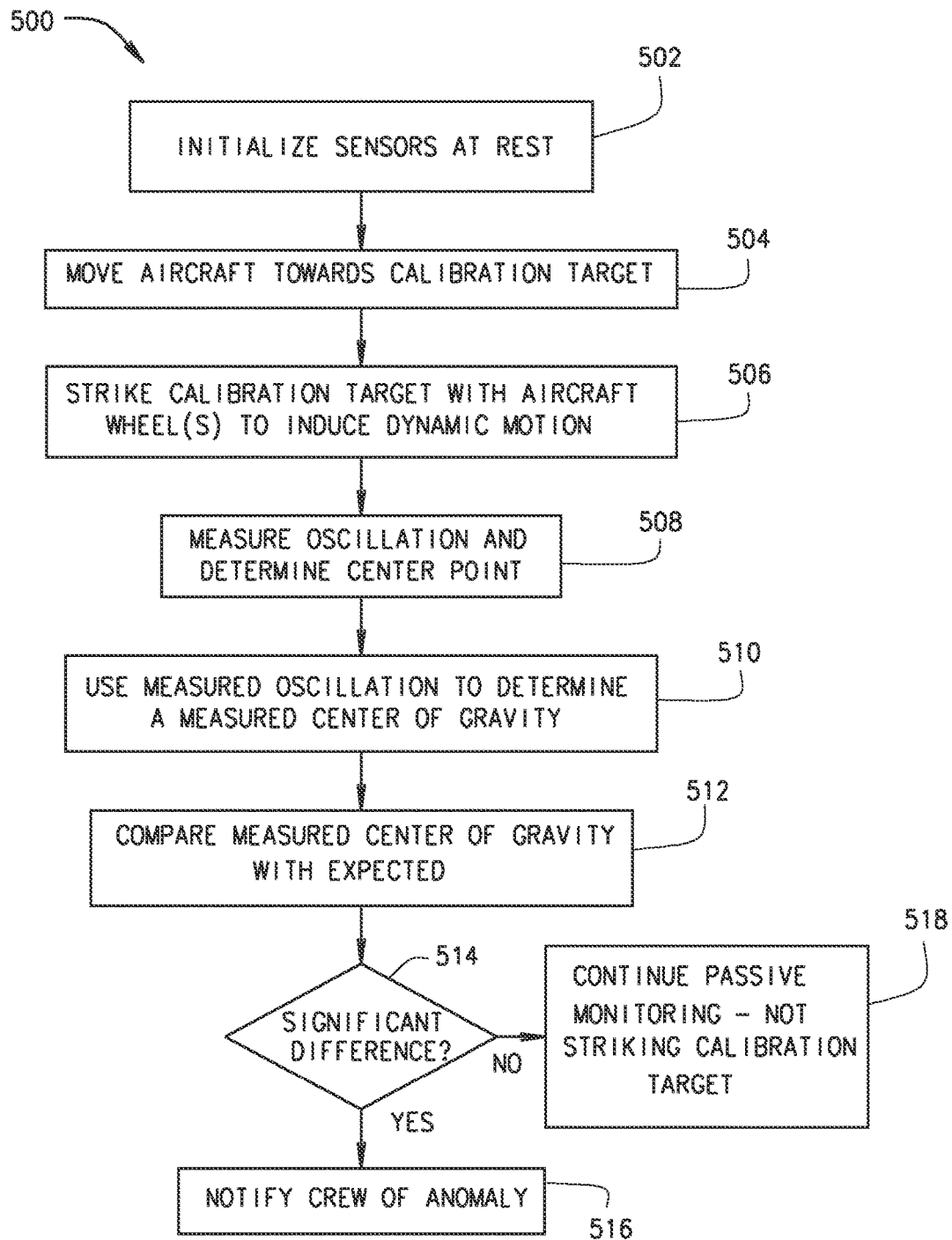
FIG. 5A is an illustration of a flow diagram of a method, according to an embodiment.
Figure 5B:
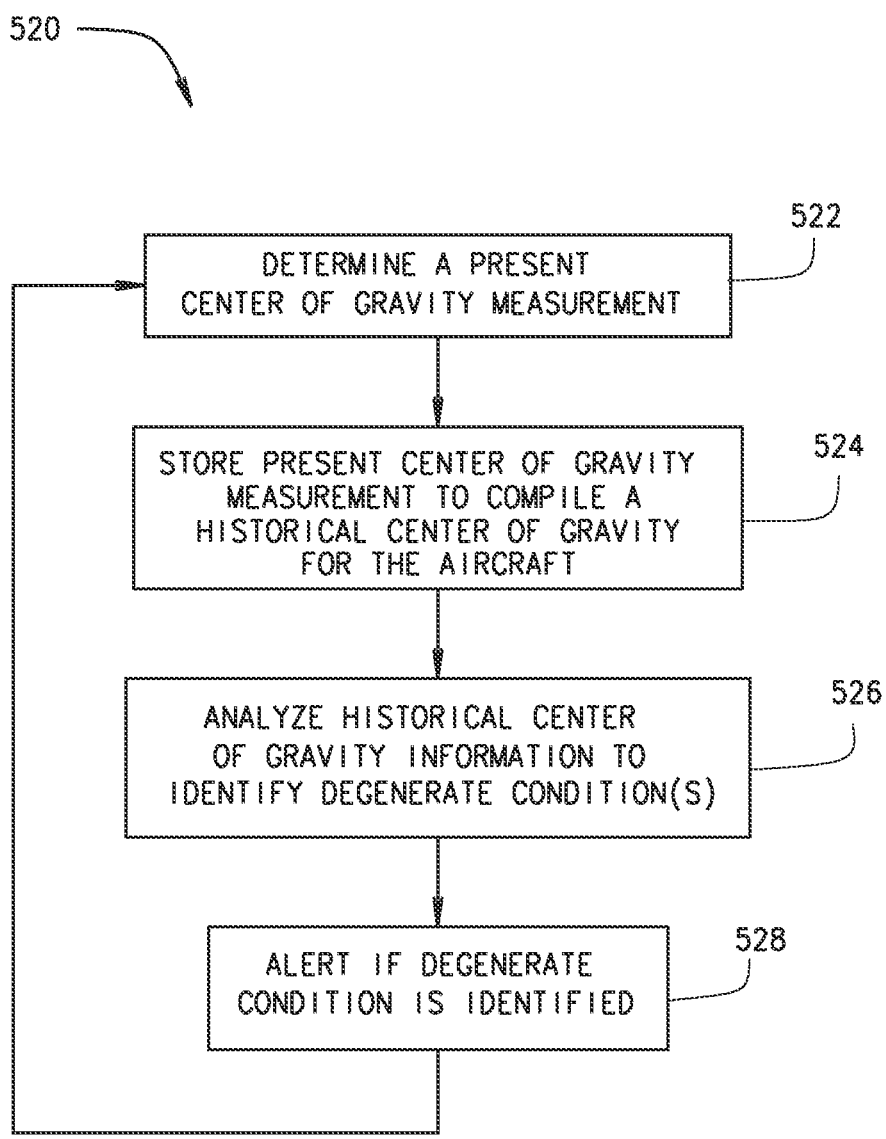
FIG. 5B is an illustration of a flow diagram of another method, according to an embodiment.

Referring to FIGS. 5A and 5B, an illustration of the process 500 using a calibrated surface irregularity and using historical data is provided. The process can include initializing the sensors when the vehicle is at rest 502, as illustrated in FIG. 4. The aircraft can move towards 504 a calibration target and strike 506 the calibration target with one of the aircraft or vehicle wheels. Striking the calibration target provides an impulse that induces oscillatory movement around at least one of pitch, roll, and yaw rotational axes. The technology as described herein can measure the oscillation and determine center point 508. Hence, the measured oscillation can be utilized to determine 510 the measured center of gravity. The measured center of gravity can be compared 512 with an expected center of gravity for this aircraft or vehicle.

The technology as disclosed can determine 514 if there is a significant difference between the measured and the expected center of gravity. For example, a significant difference may be related to a guideline, efficient, or desired operating condition. If there is a significant difference outside of a predetermined threshold a notification can be sent 516 to the driver, flight crew, or ground crew, as needed. If the measured difference is within the threshold then the technology as disclosed will continue to monitor 518 as the aircraft or vehicle continues moving along the taxiway or road surface. A further implementation of the process 500 can include a historical comparison 520, which further determines 522 a present center of gravity and stores 524 the present center of gravity measurement and compiles a historical center of gravity for the aircraft. The historical center of gravity can be analyzed 526 and identify any degenerate or anomalous conditions, such as a leaking tire or degrading structural element as described herein. The technology as disclosed can provide an alert 528 for any degenerate conditions.

Figure 5C:
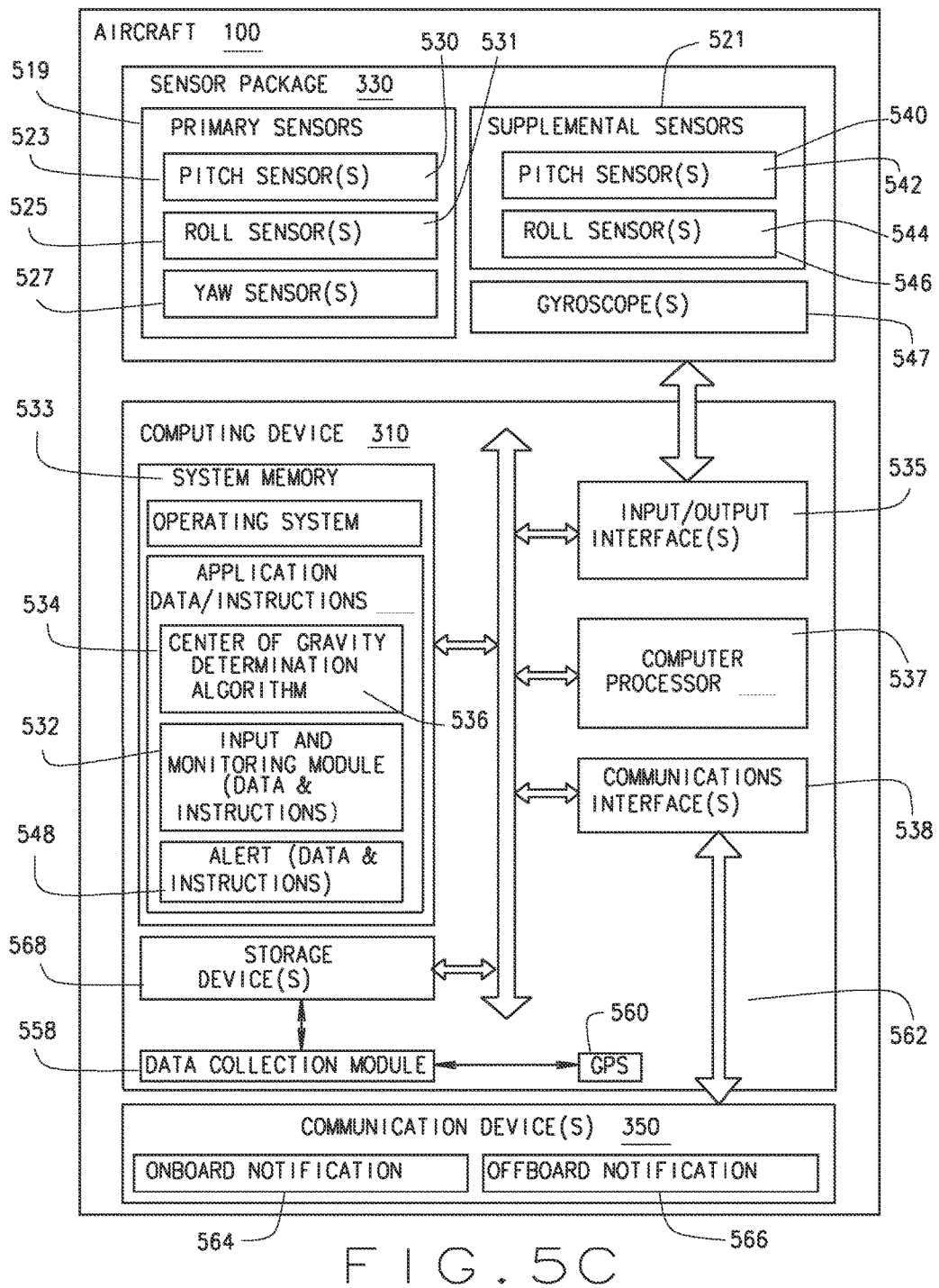
FIG. 5C is an illustration of a functional block diagram of an exemplary system showing one or more sensors, computer processors, memories and various modules for implementing one or more methods, according to an embodiment.

Referring to FIG. 5C, with one implementation of the technology at least one inertial sensor 330 sensing one of a pitch or a roll of a vehicle during ground travel and outputting one of a pitch or a roll value, 530 or 531. The inertial sensor can be a sensor package 330, which includes a primary sensor 519 and supplemental sensors 521. The primary sensors 519 can include a pitch sensor 523, a roll sensor 525 and a yaw sensor 527. The supplemental sensors 521 can include a pitch sensor 540 and a roll sensor 546 for outputting a pitch or a roll value, 542 or 544, respectively. Corresponding yaw values may also be determined and asserted. The terms primary and supplemental are relative. As described further in reference to FIG. 8, a vehicle 800 without built-in inertial sensors may consider a portable computing device 802 having sensors (804, 806) as the primary sensors (523, 525, or 527). A computing device 310 having a processor 537 and a memory 533 and an input/output interface 535 coupled to an input and monitoring module 532 being processed by said processor 537, where said input and monitoring module 532 being processed by said processor receives one of the pitch or roll values (530, 531 542, or 544), output by the at least one inertial sensor 330, and said computing system further having a measuring module 534 measuring an oscillation based on one of the output pitch or roll values and calculating an adjusted center of gravity value 536 based on a comparison between an expected oscillation and the measured oscillation. The computing device 310 can have an output coupled to an alert module 548 being processed by said processor, where said alert module 548 receives the adjusted center of gravity value and outputs an alert signal 562 through said output to a communication device 350 if the adjusted center of gravity is outside of a predetermined threshold. There can be an onboard 564 and/or an offboard 566 notification such as a maintenance alert notification. The at least one inertial sensor 330 can be a component of a built-in inertial navigation unit or a removably installed removable inertial sensor or other portable computing device. The sensor package 330 can also include gyroscope 547 as indicated.

One implementation of the technology can include a supplemental inertial sensor 530 sensing a supplemental pitch of the vehicle during ground travel where the first supplemental inertial sensor 530 is located along a lateral horizontal line passing proximately through an unladen center of gravity and outputting a supplemental pitch value 542. Also, a second supplemental inertial sensor sensing a supplemental roll of the vehicle during ground travel where the second supplemental inertial sensor is located along a vertical line passing proximately through the unladen center of gravity and outputting a supplemental roll value 544. The input and monitoring module 532 can receive the supplemental pitch and supplemental roll values 542 and 544 and calculate an adjusted center of gravity value based on a comparison between the expected oscillation and the measured oscillation sensed by the at least one inertial sensor and the first and second supplemental inertial sensors. Sensing of the supplement pitch, and sensing of the supplemental roll and sensing of one of the pitch or roll, can include sensing the vehicle during ground travel as the vehicle travels over a predetermined calibrated irregularities in a taxiway as illustrated in FIG. 4. The vehicle can be an aircraft as illustrated in FIGS. 1-4, however, the vehicle can be one of an automobile and a truck.

A historical data collection module 558 at said computer system can collect and storing over time the measured oscillation at a memory or storage device 568 and determine the expected oscillation based on the measured oscillations stored over time. A global positioning system (GPS) 560 correlating inertial sensor data of a current vehicle being currently measured with inertial sensor data of prior vehicle responses to a same ground waypoint, and determining a difference between the inertial sensor data of the current vehicle being currently measured and the inertial sensor data of prior vehicle responses, and if the difference is outside of the same ground waypoint threshold, transmitting a maintenance alert signal. With one implementation the computing device can a portable computing device such as a hand held, laptop, personal digital assistant (PDA) or other portable computing device.

One implementation of the process for detecting vehicle load anomalies during ground travel can include sensing one of a pitch or roll of a vehicle with at least one inertial sensor 330 during ground travel and outputting one of pitch or roll values (e.g. 530 or 531). The process can further include monitoring at a computing device 310 having an input 535 coupled to a monitoring module 532, with said input and monitoring module 532 and receiving one of the pitch or roll values output by the at least one inertial sensor, and further measuring at said computing system with a measuring module 534 measuring, an oscillation based on one of the output pitch or roll values and calculating an adjusted center of gravity value 536 based on a comparison between an expected oscillation and the measured oscillation. Further the process can include receiving at said computing device 310 at an output through a communications interface 538 coupled to an alert module 548, with said alert module, the adjusted center of gravity value and outputting an alert signal through said output if the adjusted center of gravity is outside of a predetermined threshold.

Yet a further implementation of the process can include sensing a supplemental pitch of the vehicle with a first supplemental inertial sensor 521 during ground travel where the supplemental inertial sensor is located along a lateral horizontal line passing proximately through an unladen center of gravity and outputting a supplemental pitch value 542; and further receiving the supplemental pitch and supplemental roll values to said input and monitoring module 532 and calculating an adjusted center of gravity value based on a comparison between the expected oscillation and the measured oscillation sensed by the at least one inertial sensor and the first and second supplemental inertial sensors. Sensing of the supplement pitch, sensing of the supplemental roll and sensing of one of the pitch or roll, includes sensing the vehicle during ground travel as the vehicle is traveling over an ordinary taxiway surface and/or a predetermined calibrated irregularity disposed upon a taxiway as illustrated in FIG. 4.

The process can further include collecting and storing over time the measured oscillation with a historical data collection module 558 at said computer system 310 at a memory 568 and determining the expected oscillation based on the measured oscillation stored over time. The process can include correlating inertial sensor data of a current vehicle being currently measured with inertial sensor data of prior vehicle responses to a same ground waypoint or ground location with a global positioning system, and determining a difference between the inertial sensor data of the current vehicle being currently measured and the inertial sensor data of prior vehicle responses, and if the difference is outside of the same ground waypoint threshold, transmitting a maintenance alert.

The application and data instructions can be stored on a non-transient computer readable medium containing program instructions for causing a computer to perform the process of monitoring at a computer having an input coupled to a monitoring module, with said input and monitoring module and receiving one of the pitch or roll values output by the at least one inertial sensor, and further measuring at said computing system with a measuring module measuring, an oscillation based on one of the output pitch or roll values and calculating an adjusted center of gravity value based on a comparison between an expected oscillation and the measured oscillation; and the process of receiving at said computing system at an output coupled to an alert module, with said alert module, the adjusted center of gravity value and outputting an alert signal through said output if the adjusted center of gravity is outside of a predetermined threshold.

The non-transient computer readable media can also contain program instruction for sensing a supplemental pitch of the vehicle with at least one first supplemental inertial sensor during ground travel where said at least one first supplemental inertial sensor is located along a lateral horizontal line passing proximately through an unladen center of gravity and outputting a supplemental pitch value. The program instruction can also instructions for sensing a supplemental yaw of the vehicle with at least one second supplemental inertial sensor during ground travel where said at least one second supplemental inertial sensor is located along a vertical line passing proximately through the unladen center of gravity and outputting a supplemental roll value; and instructions for receiving the supplemental pitch and supplemental roll values to said input and monitoring module and calculating an adjusted center of gravity value based on a comparison between the expected oscillation and the measured oscillation sensed by the at least one inertial sensor and the first and second supplemental inertial sensors.

In a further implementation, program instruction can be included for collecting and storing over time the measured oscillation with a historical data collection module at said computer system at a memory and determining the expected oscillation based on the measured oscillation stored over time. The non-transient computer readable medium can contain program instructions for causing a computer to perform the process of correlating inertial sensor data of a current vehicle being currently measured with inertial sensor data of prior vehicle responses to a same ground waypoint with a global positioning system, and determining a difference between the inertial sensor data of the current vehicle being currently measured and the inertial sensor data of prior vehicle responses, and if the difference is outside of the same ground waypoint threshold, transmitting a maintenance alert.

In yet a further implementation, the non-transient computer readable medium can contain program instructions for monitoring and measuring module having a processor and a memory having stored thereon data representative of an aircraft nominal weight and balance parameters that include aircraft weight, strut weight and performance, nominal centers of gravity for various load conditions, and related dimensions for a vehicle having at least three struts. The inertial sensor can be configured to detect one or more of a pitch, a yaw, or a roll of a vehicle during ground travel and generate respective pitch, yaw, and roll signals. The monitoring and measuring module in communication with the inertial sensor and receiving a generated respective pitch, yaw, and roll signal, and configured to measure the signals to identify oscillations corresponding to the detected pitch, yaw, and roll of the vehicle, can calculate with the nominal weight and balance parameters a new center of gravity (CG), and can generate an alert when the calculated new CG exceeds a predetermined CG envelope.

Figure 6A:
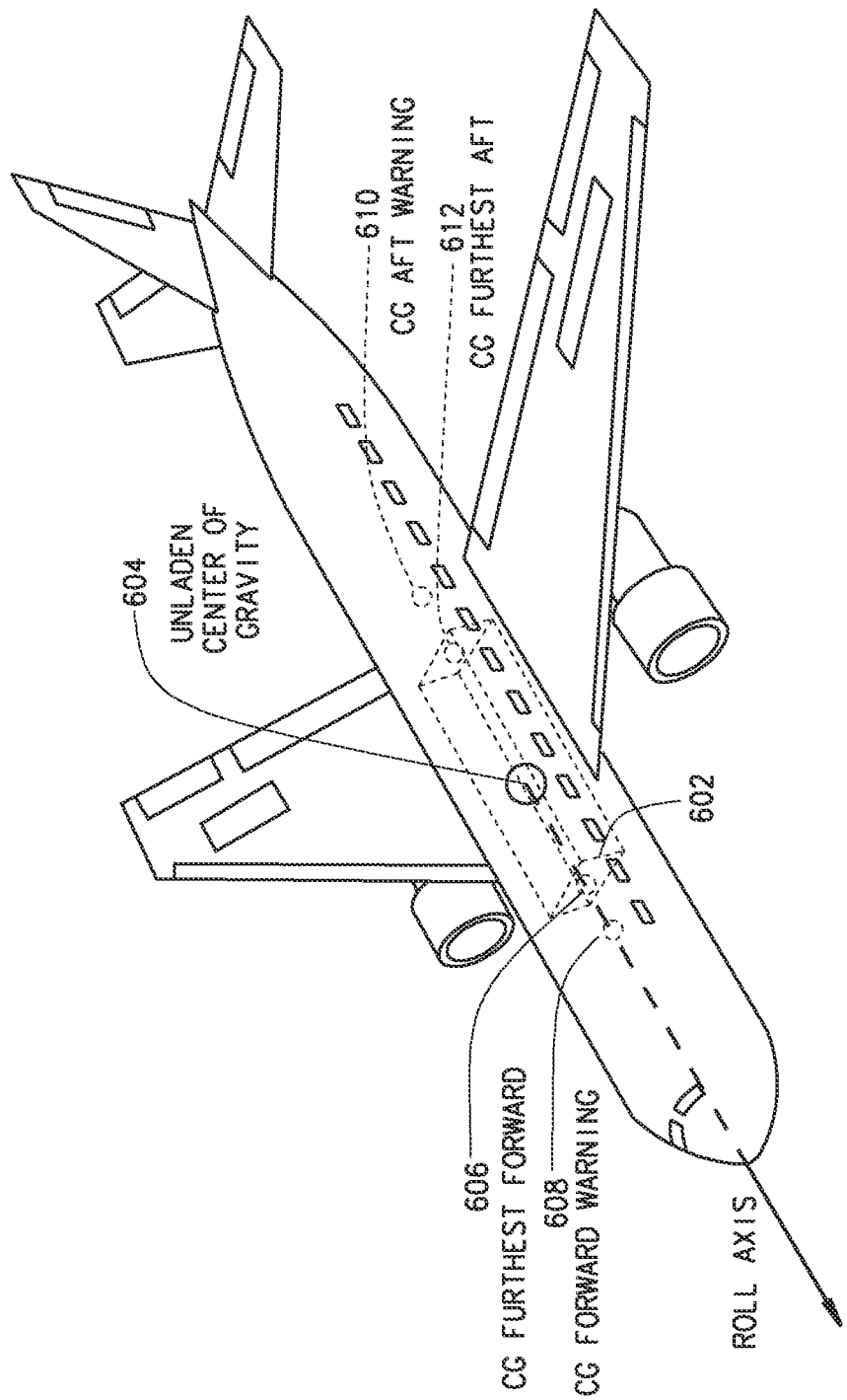
FIG. 6A is an illustration of a center of gravity threshold box with reference to an unladen center of gravity, according to an embodiment.
Figure 6B:
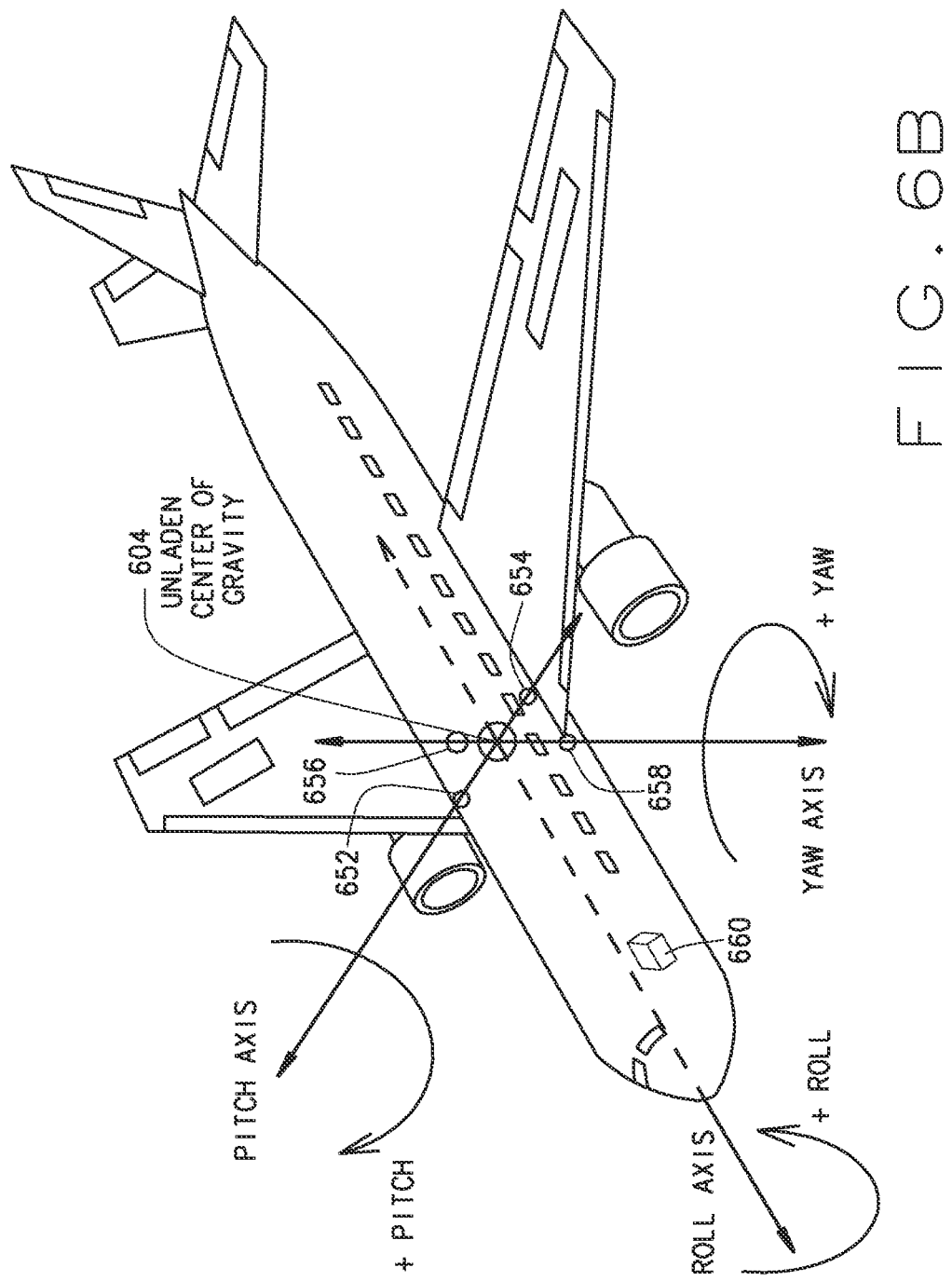
FIG. 6B is an illustration of one implementation of sensor locations with respect to unladen center of gravity, according to an embodiment.

FIG. 6A is an illustration of a center of gravity threshold box 602 with reference to an unladen center of gravity 604, according to an embodiment. The center of gravity threshold box illustrated in FIG. 6A is not drawn to scale, and the actual preferred flight parameters will depend on the particular aircraft model and actual loading of the aircraft, including fuel, cargo, and passengers, if any. As described in reference to FIGS. 5C and 6A, computing device 310 has a processor 537 and a memory 533, and an input 535 coupled to input and monitoring module 532 where the input and monitory module receives at least one or more of a pitch value (530, 542) a roll value (531, 544) and yaw values from a yaw sensor 527 to measure the oscillation behavior of the vehicle and calculate an adjusted center of gravity value based on the comparison between an expected oscillation behavior of an unladen vehicle and the measured oscillation of the laden vehicle. The observed oscillation behavior may have a center point of oscillation for each of three dimensions so the determined laden center of gravity may be moved in any or all of three dimensions to the adjusted center of gravity value based on the vehicle loading. In this manner, the center of gravity of the loaded or laden vehicle is measured. In reference to only pitch motion, an illustration of the CG furthest forward threshold 606 and the CG forward warning 608 is provided. A further illustration of the CG furthest aft threshold 612 and CG aft warning 610 is provided. In this manner, the threshold values (606, 608, 610, or 612) each define a limit for generating one or more alerts. Similar limits would apply to roll motion and/or yaw motion. If the adjusted center of gravity (CG) is displaced laterally or vertically based on asymmetric vehicle loading, the adjusted CG would also be displaced laterally or vertically. Referring to FIG. 6B an illustration of the intercept points of the empty or unladen pitch axis (652, 654) and the yaw axis (656, 658). Briefly, in reference to FIG. 1, pitch axis 104 extends along a horizontal (lateral) line that passes proximately through unladen center of gravity 604. Similarly, roll axis 108 extends along a vertical line that passes proximately through unladen center of gravity 604. As used herein, the descriptive terms such as horizontal/vertical, forward/aft, and port/starboard, are relative to each other and may be modified in view of a particular frame of reference. A built-in inertial navigation unit (INU) or inertial measurement unit (IMU) 660 may be implemented as stand-alone unit, or may be implemented with a combination of computing device 310 and sensor package 330. Supplemental sensors may be located at or near any of locations 652, 654, 656 and 658 which correspond to vehicle body intercept points of the pitch and yaw axes passing through the unladen center of gravity location. In this manner, the supplemental sensors may provide the most accurate measurement of motion around these two axes with minimal measurement distortion due to translation.

Figure 7A:
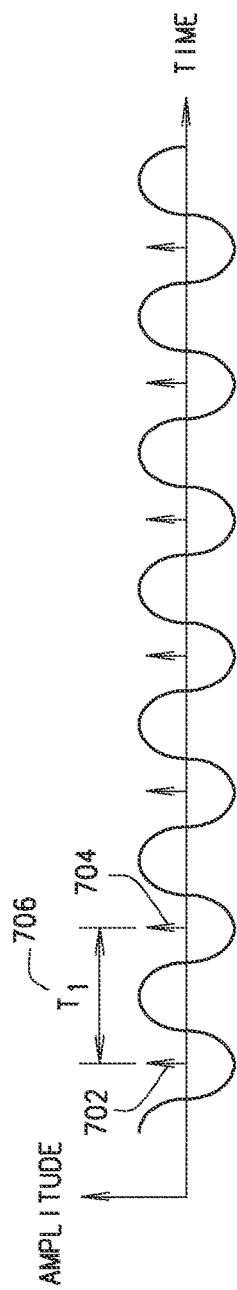
FIG. 7A, is an illustration showing exemplary oscillation signals from an inertial navigation unit (INU) when center of gravity is shifted forward, according to an embodiment.
Figure 7B:
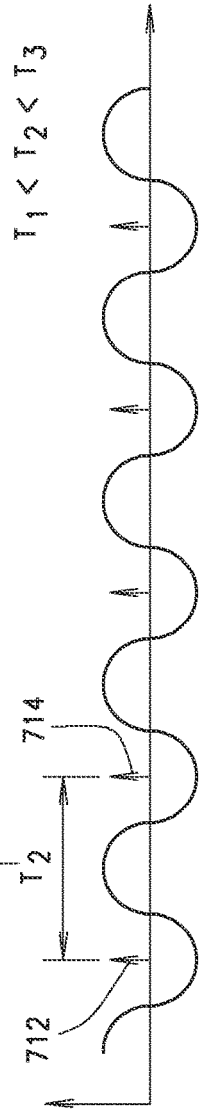
FIG. 7B, is an illustration showing exemplary oscillation signals from an inertial navigation unit (INU) when center of gravity is not changed by loading, according to an embodiment.
Figure 7C:
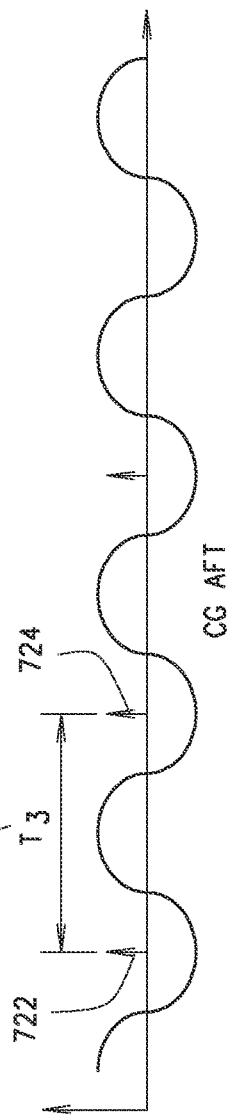
FIG. 7C, is an illustration showing exemplary oscillation signals from an inertial navigation unit (INU) when center of gravity is shifted aft, according to an embodiment.

FIG. 7, comprising FIGS. 7A, 7B, and 7C, is an illustration showing exemplary signals from an inertial navigation unit (INU) or inertial measurement unit (IMU), according to an embodiment. The signals depicted are idealized to illustrate the change in oscillation period 706, 716 and 726 (Time T1, T2 and T3 between 702 and 704; 712 and 714; and 722 and 724, respectively) based on the forward or aft loading of the aircraft. For example, for an unladen aircraft or other unladen vehicle striking a calibration bump or encountering normal surface irregularities, induced oscillation about the pitch axis will have a period T2 716 measured from a maximum rising motion or impulse at times 712 and 714 for a completed oscillation cycle. Other reference and measurement schemes may also be used, such as a slope or a zero-crossing method. If the loading of the aircraft causes the CG to be moved forward towards the nose of the aircraft, the measured oscillation about the pitch axis will have a period T1 706 measured from a rising motion at times 702 and 704 which is shorter than the unmoved CG for the unladen aircraft. Conversely, if the loading of the aircraft causes the CG to be moved aft towards the tail of the aircraft, the measured oscillation about the pitch axis will have a period T3 726 measured from a rising motion at times 722 and 724 which is longer than the unmoved CG for the unladen aircraft. The signals illustrated in FIGS. 7A-7C are idealized. Actual signals would be dampened and would decay in a somewhat exponential manner based on the energy absorbing properties of the aircraft or vehicle undercarriage. Hence, a series of repeated measurements may be logged and compared in order to reliably determine a center of gravity measurement and/or a change in the center of gravity measurement over time.

Figure 8:
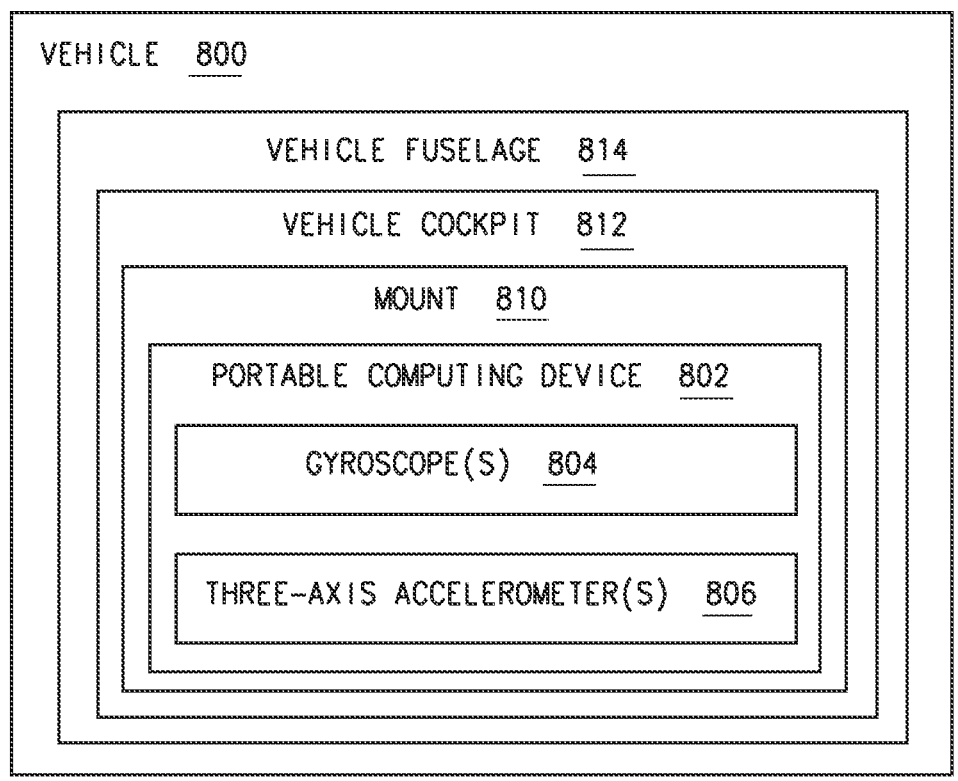
FIG. 8 is an illustration showing an exemplary embodiment suitable for an aircraft without a built-in inertial measurement unit.

FIG. 8 is an illustration showing an exemplary embodiment suitable for a vehicle without a built-in inertial navigation unit (INU) or inertial measurement unit (IMU). Example vehicles can include an aircraft, an automobile, or a truck. Alternatively, vehicle 800 may include but not use a built-in sensor package with a gyroscope or inertial sensors. In this case, the alternative embodiment may be a supplemental verification of an onboard system. When vehicle 800 is an aircraft, a flight crew member such as a pilot may carry a portable computer device 802 that may include a gyroscope 804 and/or a three-axis accelerometer 806 onto the aircraft 800 prior to and during the intended flight. When vehicle 800 is a car or a truck, a driver may carry the portable computer device 802 that may include a gyroscope 804 or a three-axis accelerometer 806 onto the car/truck 800 prior to and during driving.

For example, the gyroscope or the three-axis accelerometer 806 may be implemented as a micro-electromechanical system (MEMS) as are available from Apple Computer, Inc. (R) on various iPad (R) and iPhone (R) platforms or available from Samsung (R) on various Galaxy (R) platforms. Alternatively, the portable computing device may be implemented as a part of a portable navigation system, such as an enhanced global positioning satellite (enhanced-GPS) navigation system, suitable for use in a vehicle or an aircraft. The portable computing device 802 may be mounted to a fixed location within aircraft 800 such as a mount 810 (e.g. a docking station) next to a pilot position in a cockpit 812 of the aircraft 800 where the portable computing device 802 is operating at a fixed attitude relative to the vehicle fuselage or body 814 (e.g. vehicle frame) of aircraft 100. In this manner, the actual orientation of the portable computing device 802 does not affect the measurements after initialization when the aircraft is stopped, as described above. However, the computation of the oscillatory motion is more complex because the computational frame of reference may be rotated and shifted in three dimensions relative to an that of a built-in inertial navigation unit (INU) or inertial measurement unit (IMU) 660 such as for aircraft 100. The location of mount 810 may be information that is programmable and entered by a user upon initialization of use with vehicle 800.

When vehicle 800 is a car or truck, there are other differences due to both the unevenness and varying pitch of the roadway itself compared with a relatively flat taxiway found at an airport. For example, when detecting an unbalanced or shifted load on a truck that is heading down an a declining roadway, the pitch angle center will be shifted down from horizontal, which changes the vehicle mass-spring system due to the apparent shift in the center of gravity relative to the rest of the vehicle. During a mis-load or shift-load condition, the vehicle mass-spring system performance will respond to bumps differently, which enables calculation of the new mis-load or shift-load center of gravity. This behavior may be detected using a "window" of data that is gathered over a small period of time, or sampled over a periodic sample period, either extracted during continuous monitoring, or during a specified, repeated monitoring periods. Road conditions may necessitate a very small window of 2-3 seconds where the road surface is locally flat so the oscillations detected will be compared with a stable reference frame. Similarly, for an aircraft vehicle, a smaller or larger window may be needed. If the new mis-load or shift-load center of gravity is outside the preferred envelope, an alert can be generated.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The modules can include for example, monitoring modules, which receive sensor output data and monitors oscillations; and center of gravity modules, which calculate the adjusted center of gravity; and comparison modules that compares oscillations and center of gravity to thresholds. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. For example, the method as disclosed need not include striking a calibration target. Thus, the following claims are hereby incorporated into the Detailed Description, with each claim standing on its own as a separate embodiment.

In an example implementation, the machine can operate as a standalone device or may be connected (e.g., networked) to other machines. For example, the system as disclosed can be a standalone onboard system including one or more sensors, computer processors, memories, and various monitoring, calculation and/or comparison modules. However, the system can be implemented as a network or devices with historical data stored in a database either local to or remote from the aircraft and accessible via a network. In a networked deployment, the machine may operate in the capacity of a server or a client machine in server-client network environment, or as a peer machine in a peer-to-peer (or distributed) network environment.

The machine may be a server computer, a client computer, a personal computer (PC), a tablet PC, a Personal Digital Assistant (PDA), a cellular telephone (e.g. a smart phone), a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU) a graphics processing unit (GPU) or both), a main memory and a static memory, which communicate with each other via a bus. For example, the computer system can be the aircraft onboard computer system that includes a processor and memory that stores historical data. The computer system may further include a video/graphical display unit (e.g., a liquid crystal display (LCD), light emitting diode (LED) or a cathode ray tube (CRT)) such as the pilot's cockpit displays. The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "non-transient computer-readable medium" should be taken to include a single medium or multiple media (e.g., a centralized or distributed database, and/or associated caches and servers) that store the one or more sets of instructions in a permanent or semi-permanent, not transient, way. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various examples shown above illustrate various implementations of a system and method for detecting vehicle anomalies during ground travel. A user of the present technology as disclosed may choose any of the above implementations, or an equivalent thereof, depending upon the desired application. In this regard, it is recognized that various forms of the subject system and method for detecting vehicle anomalies could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A system for detecting vehicle load anomalies during ground travel comprising:
   at least one inertial sensor (330) sensing at least one of a pitch (110) or a roll (112) of a vehicle (100) during ground travel and outputting at least one of a pitch (530) or a roll (531) value;
   a computing device (310) having a processor (537) and a memory (533) and an input (535) coupled to an input and monitoring module (532) being processed by said processor, where said input and monitoring module being processed by said processor receives one of the pitch or roll values output by the at least one inertial sensor, said computing system further having a measuring module (534) measuring an oscillation based on one of the output pitch or roll values and calculating an adjusted center of gravity value based on a comparison between an expected oscillation and the measured oscillation;
   said computing device having an output coupled to an alert module (548) being processed by said processor, where said alert module receives the adjusted center of gravity value and outputs an alert signal (562) through said output (538) if the adjusted center of gravity value is outside of a predetermined threshold; and
   a historical data collection module (558) at said computer device collecting and storing over time the measured oscillation at a memory (568) and determining the expected oscillation based on the measured oscillation stored over time.

2. The system for detecting vehicle load anomalies during ground travel as recited in claim 1, where the at least one inertial sensor is a component of a built-in inertial navigation unit (660) or a removably installed portable computing device (802).

3. The system for detecting vehicle load anomalies as recited in claim 1, further comprising:
   at least one first supplemental inertial sensor (540) sensing a supplemental pitch of the vehicle during ground travel where said at least one first supplemental inertial sensor is located along a horizontal line (104) passing proximately through an unladen center of gravity (102, 604) and outputting a supplemental pitch value (542);
   at least one second supplemental inertial sensor (546) sensing a supplemental roll of the vehicle during ground travel where said at least one second supplemental inertial sensor is located along a vertical line passing proximately through the unladen center of gravity and outputting a supplemental roll value (544); and said input and monitoring module receives the supplemental pitch and supplemental roll values and calculating an adjusted center of gravity value based on a comparison between the expected oscillation and the measured oscillation sensed by the at least one inertial sensor and the first and second supplemental inertial sensors.

4. The system for detecting vehicle load anomalies as recited in claim 3, where sensing of the supplement pitch, sensing of the supplemental roll and sensing of one of the pitch or roll, includes sensing the vehicle motion during ground travel based on an interaction with a predetermined calibrated irregularity (402).

5. The system for detecting vehicle load anomalies as recited in claim 1, where sensing of one of the pitch or roll includes sensing the vehicle during ground travel based on an interaction with a predetermined calibrated surface irregularity (402).

6. The system for detecting vehicle load anomalies as recited in claim 1, where the vehicle is chosen from one of an aircraft, an automobile, and a truck.

7. A system for detecting vehicle load anomalies during ground travel comprising:

at least one inertial sensor (330) sensing at least one of a pitch (110) or a roll (112) of a vehicle (100) during ground travel and outputting at least one of a pitch (530) or a roll (531) value;

a computing device (310) having a processor (537) and a memory (533) and an input (535) coupled to an input and monitoring module (532) being processed by said processor, where said input and monitoring module being processed by said processor receives one of the pitch or roll values output by the at least one inertial sensor, and said computing system further having a measuring module (534) measuring an oscillation based on one of the output pitch or roll values and calculating an adjusted center of gravity value based on a comparison between an expected oscillation and the measured oscillation;

said computing device having an output coupled to an alert module (548) being processed by said processor, where said alert module receives the adjusted center of gravity value and outputs an alert signal (562) through said output (538) if the adjusted center of gravity value is outside of a predetermined threshold; and a global positioning system (560) correlating inertial sensor data of a current vehicle being currently measured with inertial sensor data of prior vehicle responses to a same ground waypoint, and determining a difference between the inertial sensor data of the current vehicle being currently measured and the inertial sensor data of prior vehicle responses, and if the difference is outside of the same ground waypoint threshold, transmitting a maintenance alert notification (564, 566).

8. The system of claim 1, wherein the computing device is a portable computing device (802).

9. A method for detecting vehicle load anomalies during ground travel comprising:

sensing at least one of a pitch or roll of a vehicle with at least one inertial sensor (330) and outputting at least one of pitch (530) or roll values (531), the vehicle being an aircraft, and the sensing occurring during ground travel of the aircraft;

monitoring at a computing system (310) having an input (535) coupled to an input and monitoring module (532), with said input and monitoring module and receiving the at least one of the pitch or roll values output by the at least one inertial sensor, and further measuring at said computing system with a measuring module (534) an oscillation (508) based on the at least one of the output pitch or roll values and calculating an adjusted center of gravity value (510) based on a comparison (512) between an expected oscillation and the measured oscillation; and receiving at said computing system at an output coupled to an alert module (548), with said alert module, the adjusted center of gravity value and outputting an alert signal (562) through said output if the adjusted center of gravity value is outside of a predetermined threshold (606 or 612).

10. The method for detecting vehicle load anomalies during ground travel as recited in claim 9, where the at least one inertial sensor is a component of a built-in aircraft inertial navigation unit (660) or a removably installed portable computing device (802).

11. The method for detecting vehicle load anomalies as recited in claim 9, further comprising:

sensing a supplemental pitch of the vehicle with at least one first supplemental inertial sensor (521) during ground travel where said at least one first supplemental inertial sensor is located along a horizontal line (104) passing proximately through an unladen center of gravity (102) of the vehicle and outputting a supplemental pitch (542) and roll (544) value; and receiving the supplemental pitch and supplemental pitch and roll values to said input and monitoring module (532) and calculating an adjusted center of gravity value (522) based on a comparison (512) between the expected oscillation and the measured oscillation sensed by the at least one inertial sensor and the first and second supplemental inertial sensors.

12. The method for detecting vehicle load anomalies as recited in claim 11, where sensing of the supplement pitch, sensing of the supplemental roll and sensing of one of the pitch or roll, includes sensing the vehicle during ground travel as the vehicle is traveling over a predetermined calibrated irregularity (402).

13. The method for detecting vehicle load anomalies as recited in claim 9, where sensing of one of the pitch or roll includes sensing the vehicle during ground travel as the vehicle travels over a predetermined calibrated irregularity disposed on a taxiway.

14. The method for detecting vehicle load anomalies as recited in claim 9, where the vehicle is one of a laden vehicle or an unladen vehicle.

15. The method for detecting vehicle load anomalies as recited in claim 9, further comprising:

collecting and storing over time the measured oscillation with a historical data collection module (558) at said computer system at a memory and determining the expected oscillation based on the measured oscillation stored over time.

16. A method for detecting vehicle load anomalies during ground travel comprising:

sensing at least one of a pitch or roll of a vehicle with at least one inertial sensor (330) during ground travel and outputting at least one of pitch (530) or roll values (531);

monitoring at a computing system (310) having an input (535) coupled to an input and monitoring module (532), with said input and monitoring module and receiving the at least one of the pitch or roll values output by the at least one inertial sensor, and further measuring at said computing system with a measuring module (534) an oscillation (508) based on the at least one of the output pitch or roll values and calculating an adjusted center of gravity value (510) based on a comparison (512) between an expected oscillation and the measured oscillation;

receiving at said computing system at an output coupled to an alert module (548), with said alert module, the adjusted center of gravity value and outputting an alert signal (562) through said output if the adjusted center of gravity value is outside of a predetermined threshold (606 or 612); and correlating inertial sensor data of a current vehicle being currently measured with inertial sensor data of prior vehicle responses (526) to a same ground waypoint with a global positioning system (560), and determining a difference between the inertial sensor data of the current vehicle being currently measured and the inertial sensor data of prior vehicle responses, and if the difference is outside of the same ground waypoint threshold, transmitting a maintenance alert notification (564, 566).

17. A non-transient computer readable medium containing program instructions for causing a computer to perform the method of:

monitoring at a computer (310) having an input (535) coupled to an input and monitoring module (532), with said input and monitoring module and receiving at least one of a pitch value (530) or a roll value (531) output by the at least one inertial sensor (330), and further measuring at said computing system with a measuring module (534), an oscillation based on one of the at least one output pitch or roll values and calculating an adjusted center of gravity value (522) based on a comparison (512) between an expected oscillation and the measured oscillation;

receiving at said computing system at an output coupled to an alert module, with said alert module (548), the adjusted center of gravity value and outputting an alert signal through said output if the adjusted center of gravity value is outside of a predetermined threshold;

correlating inertial sensor data of a current vehicle being currently measured with inertial sensor data of prior vehicle responses to a same ground waypoint with a global positioning system, determining a difference between the inertial sensor data of the current vehicle being currently measured and the inertial sensor data of prior vehicle responses, and if the difference is outside of the same ground waypoint threshold, and communicating a maintenance alert notification (564, 566).

18. The non-transient computer readable medium containing program instructions, as recited in claim 17, for causing a computer to perform the method of:

sensing a supplemental pitch of the vehicle (100) with at least one first supplemental inertial sensor (521) during ground travel where said at least one first supplemental inertial sensor is located along a horizontal line (104) passing proximately through an unladen center of gravity (102, 604) and outputting a supplemental pitch value (540);

sensing a supplemental yaw of the vehicle with at least one second supplemental inertial sensor during ground travel where said at least one second supplemental inertial sensor is located along a vertical line passing proximately through the unladen center of gravity and outputting a supplemental roll value; and receiving the supplemental pitch and supplemental roll values to said input and monitoring module and calculating an adjusted center of gravity value based on a comparison between the expected oscillation and the measured oscillation sensed by the at least one inertial sensor and the first and second supplemental inertial sensors.

19. A non-transient computer readable medium containing program instructions for causing a computer to perform the method of:

monitoring at a computer (310) having an input (535) coupled to an input and monitoring module (532), with said input and monitoring module and receiving at least one of a pitch value (530) or a roll value (531) output by the at least one inertial sensor (330), and further measuring at said computing system with a measuring module (534), an oscillation based on one of the at least one output pitch or roll values and calculating an adjusted center of gravity value (522) based on a comparison (512) between an expected oscillation and the measured oscillation;

receiving at said computing system at an output coupled to an alert module, with said alert module (548), the adjusted center of gravity value and outputting an alert signal through said output if the adjusted center of gravity value is outside of a predetermined threshold; and collecting and storing over time the measured oscillation with a historical data collection module (558) at said computer system (310) at a memory (568) and determining the expected oscillation based on the measured oscillation stored over time.

20. A system for detecting vehicle load balance anomalies during ground travel comprising:

a monitoring and measuring module having a processor and a memory having stored thereon data representative of an aircraft nominal weight and balance parameters that include aircraft weight, strut weight and performance, nominal centers of gravity for various load conditions, and related dimensions for a vehicle having at least three struts;

at least one inertial sensor configured to detect one or more of a pitch, a yaw, or a roll of a vehicle during ground travel and generate respective pitch, yaw, and roll signals;

said monitoring and measuring module in communication with the at least one inertial sensor and receiving a generated respective pitch, yaw, and roll signal, and configured to measure the signals to identify oscillations corresponding to the detected pitch, yaw, and roll of the vehicle, to calculate with the nominal weight and balance parameters a new center of gravity "CG", and to generate an alert when the calculated new CG exceeds a predetermined CG envelope.

21. The system for detecting vehicle load balance anomalies as recited in claim 20, where the at least one inertial sensor is a component of at least one of a built-in inertial navigation unit (660) and at least one removable inertial sensor (802).

\* \* \* \* \*